Oct. 14, 1930.  W. M. GENETT  1,778,591
VENTILATOR
Filed Oct. 20, 1928

William M. Genett
INVENTOR
BY Victor J. Evans
ATTORNEY

Patented Oct. 14, 1930

1,778,591

UNITED STATES PATENT OFFICE

WILLIAM M. GENETT, OF MILWAUKEE, WISCONSIN

VENTILATOR

Application filed October 20, 1928. Serial No. 313,813.

This invention relates to improvements in ventilating means especially designed for closed body automobiles, an object being to provide means for supplying fresh air to the interior of the automobile, and for drawing out foul air, so that in the event it becomes necessary to entirely close the windows of the automobile, proper ventilation may be had.

Another object of the invention is the provision of a ventilating means which in addition to the above stated advantages, will provide a cooling chamber in the top of the automobile and thus act as a barrier against the sun's rays.

With the above and other objects in view, the invention further includes the following novel features and details of construction, to be hereinafter more fully described, illustrated in the accompanying drawings and pointed out in the appended claim.

In the drawings:—

Figure 1:
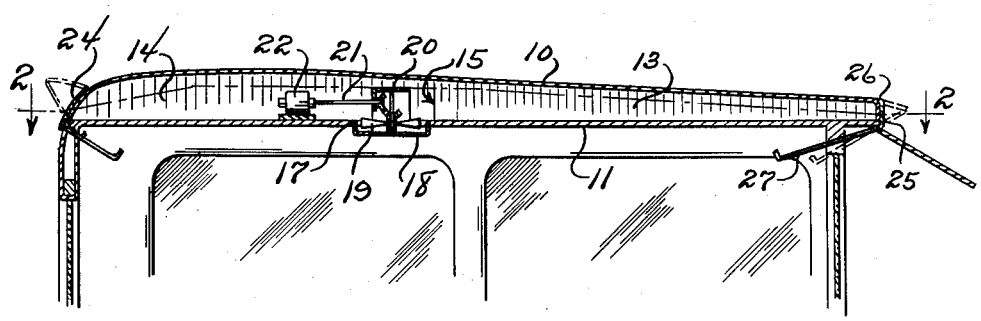
Figure 1 is a longitudinal sectional view through the top of an automobile illustrating the invention.
Figure 2:
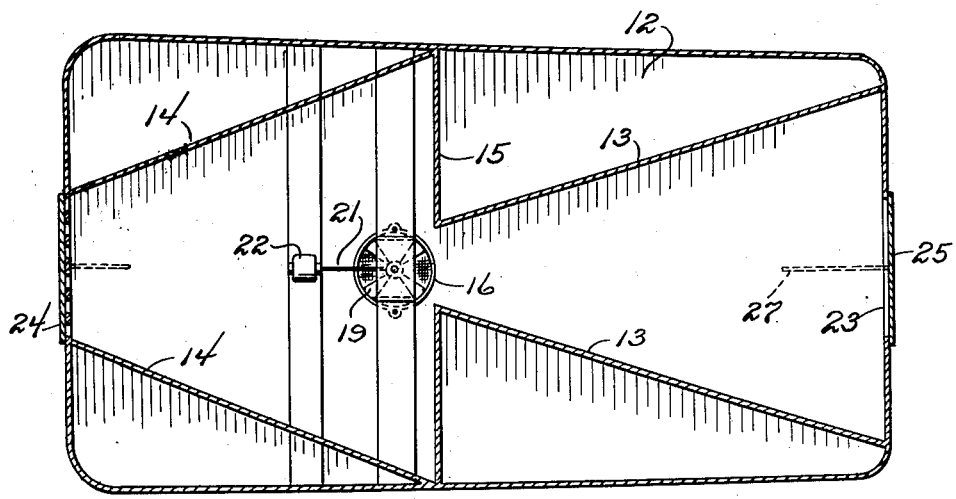
Figure 2 is a section on the line 2—2 of Figure 1.

Referring to the drawings in detail wherein like characters of reference denote corresponding parts, the reference character 10 indicates the top of an automobile which is of hollow construction and includes a top wall 10 and a false top or lining 11 spaced therebeneath. An air chamber 12 is thus provided through which a circulation of air may be set up so as to act as a barrier for the rays of the sun.

The chamber 12 has arranged therein partitions 13 and 14 which are connected by transverse partitions 15 so that a passage is provided from the front to the rear of the chamber 12. The partitions 13 converge rearwardly so as to provide a restricted passage 16 and located adjacent this passage is an opening 17 providing communication with the interior of the body of the automobile. This opening is provided with a wide mesh screen 18 which extends downwardly for a slight distance into the interior of the automobile.

Rotating within the opening 17 is a fan 19 which is connected by means of gears 20 with a shaft 21 which is driven by a motor 22. This motor is connected with the battery of the automobile by means of suitable wiring (not shown) and controlled by a suitably positioned switch or button.

The hollow top thus provided is formed at its front with an opening 23 and at its rear with openings 24. The openings 23 and 24 may be closed by means of plates 25 which are hingedly mounted as indicated at 26 and have pivotally connected thereto adjusting rods 27 which extend into the body of the automobile.

From the foregoing description and accompanying drawings it will be seen that the plates 25 may be raised to permit a circulation of air through the top of the automobile while the latter is being driven so as to produce a cooling effect and insulate the interior of the automobile from the rays of the sun, some of the air passing downward into the automobile through the screened opening 17.

Further air supply may be provided by raising the front plate 25 so as to uncover the opening 23 and closing the openings 24 and operating the fan so that a supply of fresh air is forced into the interior of the automobile when the latter is standing with the windows and doors closed. A supply of fresh air may also be furnished when the automobile is moving forward without the use of the fan, by uncovering the opening 23 and closing the openings 24.

In the event that it is necessary to entirely close the windows of the automobile, the latter may be ventilated without forcing cool air inward by closing the opening 23 and uncovering the openings 24. Operation of the car, due to the suction through the opening 24 will then draw foul air from the interior of the automobile.

The invention is susceptible of various changes in its form, proportions and minor details of construction and the right is herein reserved to make such changes as properly fall within the scope of the appended claim.

Having described the invention what is claimed is:—

In a vehicle body, a hollow top having communication with the interior of the vehicle and openings at its front and rear ends, converging side walls providing a restricted passage within the top at the point of communication with the interior of the vehicle, a fan at such point of communication, and means to control the openings at the front and rear of the top.

In testimony whereof I affix my signature.

WILLIAM M. GENETT.